United States Patent
Forslund et al.

(10) Patent No.: US 9,571,905 B2
(45) Date of Patent: Feb. 14, 2017

(54) PLUGGABLE MODULE

(71) Applicant: TELEFONAKTIEBOLAGET L M ERICSSON (PUBL), Stockholm (SE)

(72) Inventors: Anders Forslund, Skellefteå (SE); Hans Von Goes, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 94 days.

(21) Appl. No.: 14/403,387

(22) PCT Filed: May 14, 2013

(86) PCT No.: PCT/SE2013/050532
§ 371 (c)(1),
(2) Date: Nov. 24, 2014

(87) PCT Pub. No.: WO2013/180623
PCT Pub. Date: Dec. 5, 2013

(65) Prior Publication Data
US 2015/0189406 A1    Jul. 2, 2015

(30) Foreign Application Priority Data
May 30, 2012  (EP) .................................. 12170065

(51) Int. Cl.
*H04Q 9/00* (2006.01)
*H04L 29/08* (2006.01)
*G01V 1/22* (2006.01)
*H04W 88/08* (2009.01)

(52) U.S. Cl.
CPC *H04Q 9/00* (2013.01); *G01V 1/22* (2013.01); *H04L 67/125* (2013.01); *H04W 88/085* (2013.01)

(58) Field of Classification Search
CPC ............ H04Q 9/00; G01V 1/22; H04L 67/125
See application file for complete search history.

(56) References Cited

U.S. PATENT DOCUMENTS

| | | | |
|---|---|---|---|
| 7,602,301 B1 * | 10/2009 | Stirling ................ | A61B 5/1127 340/573.1 |
| 2004/0103139 A1 | 5/2004 | Hubbard | |
| 2006/0031426 A1 * | 2/2006 | Mesarina ............... | G01D 21/00 709/220 |
| 2006/0242285 A1 | 10/2006 | Moriwaki | |
| 2008/0143512 A1 * | 6/2008 | Wakisaka .......... | H04W 74/0808 340/504 |
| 2011/0084800 A1 | 4/2011 | Ko | |

OTHER PUBLICATIONS

"Transforming Earthquake Detection?", Science, vol. 335, Jan. 20, 2012, pp. 297-298.

* cited by examiner

Primary Examiner — Leon Flores

(57) ABSTRACT

A pluggable module is provided which is configured to be connected into a pluggable port of a radio base station. The pluggable module is associated with at least one sensor for collecting external sensor data. The pluggable module comprises at least one communication interface, a processor, and a memory for storing software comprising computer program code which, when run in the processor, causes the pluggable module to collect pre-specified external sensor data from at least one sensor associated with the pluggable module and communicate the collected external sensor data to a centralized server via the at least one communication interface.

13 Claims, 2 Drawing Sheets

PLUGGABLE MODULE

RELATED APPLICATIONS

This application is a 371 of international application PCT/SE2013/050532, filed May 14, 2013, which claims priority to European Patent Application No. 12170065.2, filed May 30, 2012, the disclosure of which is fully incorporated herein by reference.

TECHNICAL FIELD

Embodiments of the present disclosure generally relate to collection of sensor data and the communication of such sensor data to a centralized server.

BACKGROUND

The article "Transforming Earthquake Detection?" published in SCIENCE, Volume 335, Jan. 20, 2012 describes the use of today's communication infrastructure, i.e. the Internet to collect external data such as earth movements. Earth movement data may be used for earthquake detection. One way to detect the earth movements may be to make use of the accelerometers that are provided in today's consumer electronic devices, such as laptop computers and smart phones. There are today applications, i.e. so called apps, for smart phones that record seismic waveforms and transmits them to a central server when it detects an earthquake. There are also similar examples of data collection made by laptop computers, which are provided with accelerometers. One problem with collecting such data is that accelerometers provided in laptop computers and smart phones are orders of magnitude less sensitive than the instruments in traditional networks, and earthquake signals must also be separated from everyday movements. Another problem with this solution is that there is not always reliable location data available for the laptop computer or the smart phone. Without a reliable location the earth movement data is not as useful as if an exact location can be associated with it.

It is also known to integrate sensors in a Universal Serial Bus, USB stick. One example of such a sensor is an accelerometer. These USB-based accelerometers may be plugged into laptop computers in order to build a large distributed network of seismometers in earthquake-prone regions. In such a case software will have to be installed in each laptop computer, which will act as a host for the USB stick and collect the sensor data. The laptop computer also needs to be connected to the Internet in some way in order to make use of all the collected data in the distributed network. Thus, the USB stick is not useable in a straightforward manner since it needs to be installed in a host, the location of which is not always known as mentioned above.

SUMMARY

The present disclosure relates to mechanisms that address at least some of the problems and issues described above and enable collecting of reliable external sensor data and communication of such sensor data to a centralized server.

According to one aspect, a pluggable module is provided, which module is configured to be connected into a pluggable port of a radio base station. The pluggable module is associated with at least one sensor for collecting external sensor data. The pluggable module comprises at least one communication interface, wherein the communication interface comprises at least one of an optical fiber interface or an RBS transceiver interface. The pluggable module further comprises a processor and a memory for storing software comprising computer program code which, when run in the processor, causes the pluggable module to: Collect pre-specified external sensor data from the at least one sensor associated with the pluggable module and communicate the collected external sensor data to a centralized server via the at least one communication interface.

The sensor for collecting external data may be provided as an internal sensor in the pluggable module or outside the pluggable module and may be an accelerometer configured to collect movement data or metrological sensor configured to collect metrological data. The external sensor data is technically independent from the pluggable module, i.e. the data is not related to the pluggable module itself.

In preferred embodiments the pluggable module may furthermore comprise a filter for filtering out pre-specified external sensor data.

In yet other preferred embodiments the communication interface of the pluggable module may be an optical fiber interface, a RBS transceiver interface, an Inter-Integrated Circuit, I$^2$C interface, or any combination thereof.

According to a second aspect, a system for collecting external sensor data is provided. The system comprises a pluggable module according to the first aspect, a radio base station into which the pluggable module is plugged and a centralized server. The centralized server is configured to receive external sensor data communicated from the pluggable module.

According to a third aspect, a method for collecting external sensor data in a communication network is provided. The communication network comprises at least one radio base station, at least one pluggable module according to the first aspect plugged into the radio base station and a centralized server. The method comprises: Collecting pre-specified external sensor data from at least one sensor associated with the pluggable module and communicating the collected external sensor data to the centralized server via a communication interface of the pluggable module.

With the above pluggable module, system and method external sensor data may be collected in a reliable way without having to install any software in the device hosting the pluggable module. Furthermore, using a radio base station as a host will also tie the collected external sensor data to a specific location, since the location of radio base stations is already known. Using an already existing communication network will also substantially reduce the costs for collecting external sensor data.

BRIEF DESCRIPTION OF THE DRAWINGS

These and other aspects, features and advantages will be apparent and elucidated from the following description of embodiments, reference being made to the accompanying drawings, in which.

DETAILED DESCRIPTION

Today there exist a lot of different pluggable modules on the market optical as well as electrical pluggable modules. Examples of such optical and electrical pluggable modules are, but not limited to, Small Form-factor Pluggable, SFP, SFP+, Quad SFP, QSFP, CXP, XFP, XENPAK, and GBIC modules. These modules are compact and hot-pluggable transceivers used for both telecommunication and data communication applications.

The form-factor and the electrical interface for optical pluggable modules are specified by MultiSource Agreements, MSA, e.g. INF 8074i. This format is popular and supported by many network component vendors, which has made them widely spread. The optical pluggable module interfaces telecommunication and data network devices, such as switches, routers, radio base stations, media converters etc, to a fiber optic cable or copper cable.

Some of these optical pluggable modules contain sensors for gathering internal data, i.e. data that is technically related or dependent on the optical pluggable module. Such internal data is important for determining the health and performance of the optical pluggable modules. Such internal data may be standardized (Small Form-Factor, SFF-8472 Specification) and relates to data such as internal temperature, supply voltage, laser bias current, optical transmit power, optical receive power etc. The optical pluggable modules typically contain a small processor and a memory to store and/or update the measurement data. Furthermore, the optical pluggable modules may contain an interface, often called digital (monitoring) interface, allowing the measurement data to be accessed from the outside.

Today the industry of optical and electrical pluggable modules is driven mainly by low price and high integration, i.e. limit power consumption, limit space etc. The inventors have realized that it is possible to use pluggable modules as a host for external sensors. It is true that providing the pluggable module with more functionality would break against the main objective of the industry of pluggable modules, especially the SFP industry, which is mainly driven by low price and high integration, i.e. limit power consumption, limit space etc. Nevertheless the inventors decided to do so. The inventors also recognized that there is an existing infrastructure of Radio Base Stations, RBSs, the location of which is fixed and known by the telecommunication network. In context of the present invention the term RBS should be given a broad interpretation and should also include such devices as full, medium and micro outdoor and indoor RBSs, as well as Radio Remote Units designed to be mounted near the antenna to minimize the feeder loss as long as they have pluggable ports into which the pluggable modules may be fitted.

The invention will now be described more fully hereinafter with reference to the accompanying drawings, in which certain embodiments of the invention are shown.

Figure 1:
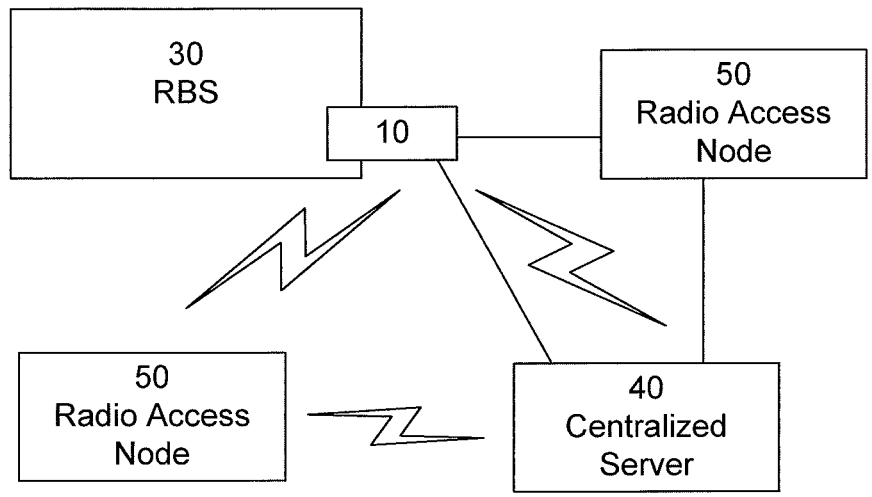
FIG. 1 is an schematic diagram showing an example of a system for collecting external sensor data.

FIG. 1 is a schematic diagram showing a possible environment where embodiments of the invention described herein can be applied. The diagram illustrates a pluggable module 10 which is inserted into a pluggable port of a RBS 30, a centralized server 40 and several radio access nodes 50. Even if the pluggable module 10 is shown as connected to both the centralized server 40 and a radio access node 50 it should be understood that a pluggable module 10 only has one external connection. Thus, FIG. 1 illustrates that the pluggable module 10 is connected either to the centralized server 40 or to the radio access node 50

Figure 2:
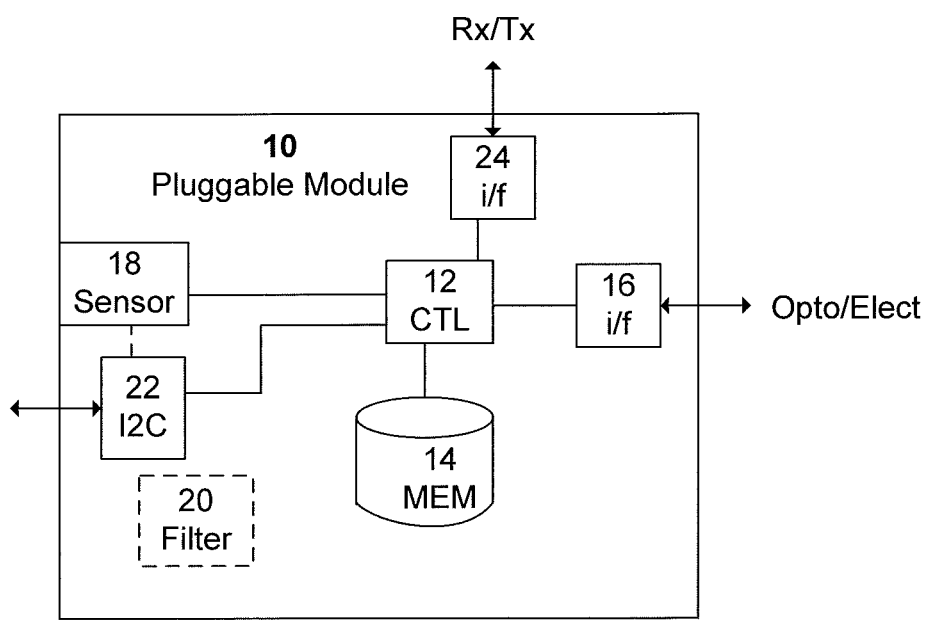
FIG. 2 is a schematic diagram illustrating a pluggable module having an internal sensor for collection of external data according to one embodiment.
Figure 3:
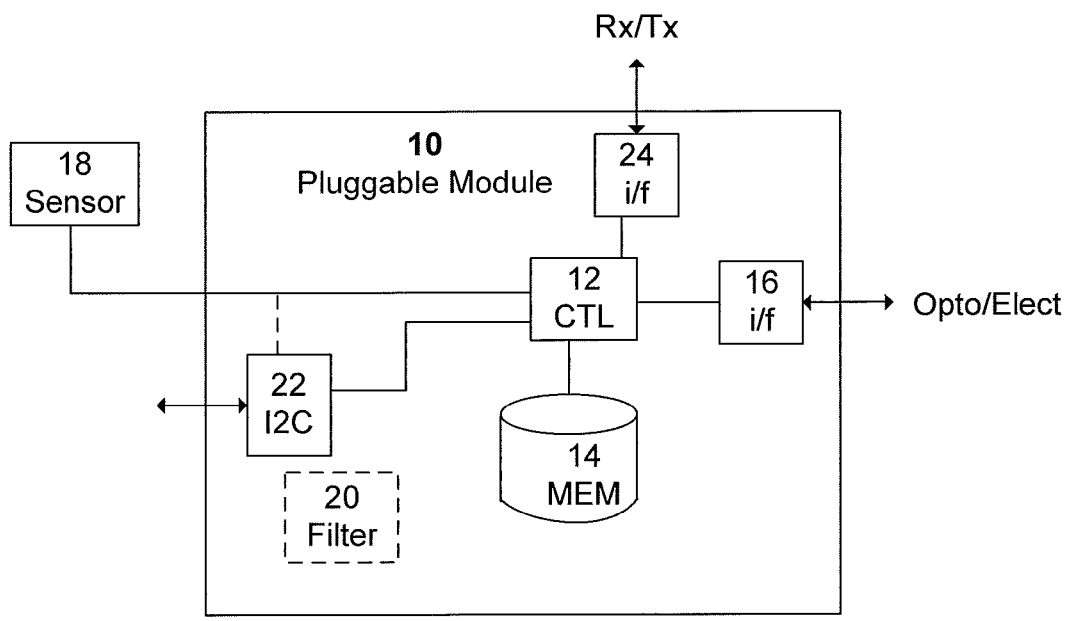
FIG. 3 is a schematic diagram illustrating a pluggable module having an associated external sensor provided outside the pluggable module for collection of external data according to another embodiment.

Turning now to FIGS. 2 and 3 different embodiments of the pluggable module 10 will be described. The pluggable module 10 may comprise a controller (CTL) or a processor 12, a memory (MEM) 14, a least one communication interface 16; 22; 24, at least one associated sensor 18 and a filter 20. The processor 12 may be constituted by any suitable Central Processing Unit, CPU, microcontroller, Digital Signal Processor, DSP, etc., capable of executing a computer program or software comprising computer program code. The computer program may be stored in the memory (MEM) 14. The memory 14 can be any combination of Read And write Memory, RAM, and Read Only Memory, ROM. The memory 14 may also comprise persistent storage, which, for example, can be any single one or combination of magnetic memory, optical memory or solid state memory 14. When the above-mentioned computer program code is run in the processor 12 of the pluggable module 10, it causes the pluggable module 10 to collect pre-specified external sensor data from the at least one sensor 18 associated with the pluggable module 10 and communicate the collected external sensor data to the centralized server 40 via one of the communication interfaces 16; 22; 24.

The pluggable module 10 in FIGS. 2 and 3 is depicted with three different communication interfaces 16; 22; 24. It should be understood that the pluggable module 10 may also have only one of the communication interfaces or any combination of two communication interfaces. The first communication interface may be an optical fiber interface 16 and the second communication interface may be a RBS transceiver (RX/TX) interface 24. These two types of interface are today usually present in optical pluggable modules for creating a pass-through connection that connects a RBS radio transceiver to a laser/photo diode of the optical pluggable module and further to an optical fiber. In the optical pluggable modules of today no processing is performed on the signals, except for amplification etc. Thus, today the optical pluggable module itself cannot send any information on these two interfaces. It is the host of the pluggable module 10, i.e. the RBS 30, which sends any data which then is physically transceived by the pluggable module.

According to one preferred embodiment there is provided software in the memory 14 of the pluggable module 10, which when run in the processor 12 causes the pluggable module 10 to perform processing of data inside such that it may be sent directly by the pluggable module 10 over either the optical fiber interface 16 or the RX/TX interface 24. This may be done protocol specific by e.g. inserting extra data packets or out-of-band in which case the extra data may be transmitted on top of the normal traffic by modulation, wavelength multiplexing or some other technology. The advantage with using the optical fiber interface 16 or the RX/TX interface 24 to send data directly from the pluggable module 10 is that the pluggable module 10 may be retrofitted in an existing host, such as a radio base station. The pluggable module 10 then provides for remote access to external sensor data without the need to make any additional software or hardware changes in the host.

In some embodiments the pluggable module 10 is realized in form of an electrical pluggable module. In such cases the optical fiber interface 16 is substituted with electrical interface and data is for example sent on a copper cable instead of an optical fiber. Electrical pluggable modules are typically used in installations with short transmission distances, i.e. less than 10 meters. In contrast, optical SFPs typically provide communication over longer distances, with very high capacity and no crosstalk or interference from the surrounding environment.

In some embodiments the control interface of the pluggable module may be used as communication interface. For an optical pluggable module this control interface may be an Inter-Integrated Circuit, I²C interface 22. In this case the I²C interface 22 may provide access for the at least one sensor 18, which is configured to collect external data. This external data is then accessible by the host, such as the radio base station, through the I²C interface 22, which host may use any of its own communication channels to send the collected data to a centralized server 40.

The sensor 18 that is associated with the pluggable module 10 may be provided as a sensor internally arranged in the pluggable module 10, as depicted in FIG. 2, or be provided outside, i.e. externally of, the pluggable module 10, as is depicted in FIG. 3. According to embodiments the sensor 18 for collecting external sensor data may be any type of sensor. Examples of such sensors include but are not limited to accelerometers, different types of metrological sensors, such as temperature sensors, hygrometers, barometers etc, different types of air borne data sensors, such as sound, radiation and air pollution sensors. The sensor may also be a video camera configured to collect and distribute video data.

The accelerometer may for example be used to collect earthquake data or for high resolution surveillance of ground movements in order to try to predict earthquakes. Accelerometers may also be used for monitoring telecommunication tower movements in order to verify installation robustness and predict possible future failures.

According to some embodiments the pluggable module is provided with a filter 20. The filter may be used to filter out the desirable external sensor data. For example in some cases it is may be interesting to know how a telecommunication tower is affected by the surrounding wind conditions and vibrations pertaining to traffic passing the telecommunication tower should be filtered away. Adding a filter to the pluggable module will increase the range of applications while offloading data collection at central locations. The filter 20 may be realized by signal processing software storable in the memory 14 and executable by the processor 12.

In the present disclosure the term external sensor data sensor data is used as a definition of data that is collected by the pluggable module 10. By external sensor data is meant any sensor data that is not technically related to or dependent on the pluggable module 10 itself. Thus, all sensor data relating to the pluggable module 10 itself, such as internal temperature, supply voltage, laser bias current, optical transmit power, optical receive power etc as mentioned above, are excluded by the term external sensor data.

Figure 4:
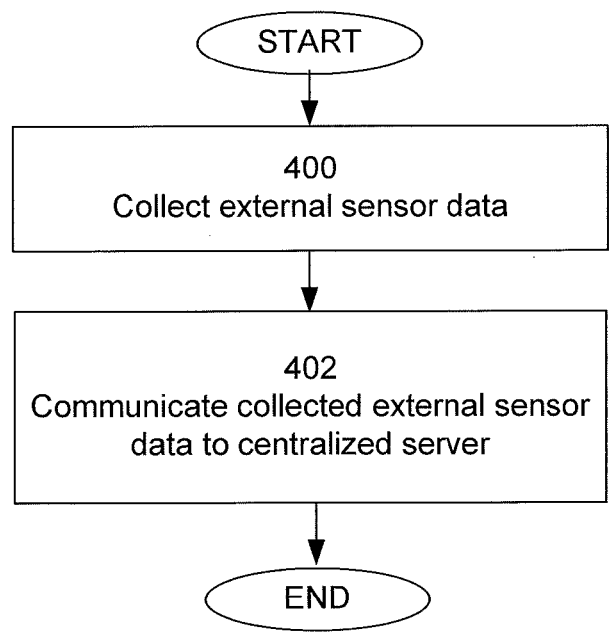
FIG. 4 is a flow chart showing a method for performed in the pluggable module according to one embodiment.

Turning now to FIG. 4 together with FIG. 1, a method for collecting external sensor data in a communication network will be described. The communication network comprises at least one radio base station 30, at least one pluggable module 10 plugged into the radio base station 30 and a centralized server 40. The communication network may also comprise radio access nodes 50. It should be understood that FIG. 1 is very simplified for illustrative purposes and that in reality the communication network comprises many, many radio base station, pluggable modules 10, radio access nodes etc.

The method starts in step 400 where it collects pre-specified external sensor data using sensor 18. In next step 402 the collected external sensor data is communicated to the centralized server 40. This communication to the centralized server 40 may be done in a number of ways using any of the communication interfaces 16; 22; 24 described above in conjunction with FIGS. 2 and 3. For example if the fiber optical/electrical interface 16 is used to communicate the collected external sensor data the data is sent to the centralized server 40 through optical fiber or copper cable. The data may be sent directly to the centralized server 40 or via one or more radio access nodes 50. If instead the RX/TX interface 24 is used, the collected external sensor data is sent by radio, either directly or indirectly via the radio access nodes 50, to the centralized server 40. There is also the option to use the control interface 22 in which case the communication of external sensor data to the centralized server 40 is done via the radio base station that hosts the pluggable module 10.

The centralized server 40 is used to gather and process all external sensor data. If the external sensor data is metrological the centralized server 40 may be used to make weather forecasts, if the external sensor data is pollution data the centralized server may be configured to issue warnings and so on.

Although the present invention has been described above with reference to specific embodiments, it is not intended to be limited to the specific form set forth herein. Rather, the invention is limited only by the accompanying claims and, other embodiments than specified above are equally possible within the scope of the appended claims. In the claims, the term "comprise/comprises" does not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Reference signs in the claims are provided merely as a clarifying example and should not be construed as limiting the scope of the claims in any way.

The invention claimed is:

1. A pluggable module configured to be connected into a pluggable port of a Radio Base Station (RBS), the pluggable module being associated with at least one sensor for collecting external sensor data, the pluggable module comprising:
  at least one communication interface, wherein the at least one communication interface comprises at least one of an optical fiber interface or an RBS transceiver interface, and the at least one communication interface is configured to be remotely accessible by a centralized server;
  a processor; and
  a memory for storing software comprising computer program code which, when run in the processor, causes the pluggable module to:
    collect pre-specified external sensor data from the at least one sensor associated with the pluggable module; and
    communicate the collected external sensor data directly to the centralized server via the at least one communication interface while the pluggable module is connected into a pluggable port of the RBS.

2. The pluggable module according to claim 1, wherein the at least one sensor is provided as an internal sensor in the pluggable module.

3. The pluggable module according to claim 1, wherein the at least one sensor is provided outside the pluggable module.

4. The pluggable module according to claim 1, wherein the external sensor data is technically independent from the pluggable module.

5. The pluggable module according to claim 1, further comprising a filter for filtering out non pre-specified external sensor data.

6. The pluggable module according to claim 5, wherein the filter is realized by signal processing software storable in the memory and executable by the processor.

7. The pluggable module according to claim 1, wherein the at least one sensor comprises an accelerometer configured to collect movement data.

8. The pluggable module according to claim 1, wherein the at least one sensor is configured to collect metrological data.

9. The pluggable module according to claim 1, wherein the at least one communication interface is an optical fiber interface configured to be remotely accessible by the centralized server, and configured to send the collected external sensor data to the centralized server upon request from the centralized server.

10. The pluggable module according to claim 1, wherein the at least one communication interface comprises the RBS transceiver interface, the RBS transceiver interface configured to be remotely accessible by the centralized server, and further configured to send the collected external sensor data to the centralized server upon request from the centralized server.

11. The pluggable module according to claim 1, wherein the at least one communication interface further comprises an Inter-Integrated Circuit (I$^2$C) interface.

12. The pluggable module according to claim 1, wherein the pluggable module is an optical pluggable module.

13. A system for collecting external sensor data comprising:
- a pluggable module according to claim 1;
- a radio base station into which the pluggable module is plugged; and
- a centralized server configured to receive external sensor data communicated directly from the pluggable module while the pluggable module is plugged into the radio base station.

* * * * *